US012505296B2

(12) United States Patent
Schillace et al.

(10) Patent No.: US 12,505,296 B2
(45) Date of Patent: Dec. 23, 2025

(54) PROMPT GENERATION SIMULATING FINE-TUNING FOR A MACHINE LEARNING MODEL

(71) Applicant: Microsoft Technology Licensing, LLC, Redmond, WA (US)

(72) Inventors: Samuel Edward Schillace, Portola Valley, CA (US); Umesh Madan, Bellevue, WA (US); Devis Lucato, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 288 days.

(21) Appl. No.: 18/129,772

(22) Filed: Mar. 31, 2023

(65) Prior Publication Data

US 2024/0202452 A1 Jun. 20, 2024

Related U.S. Application Data

(60) Provisional application No. 63/442,540, filed on Feb. 1, 2023, provisional application No. 63/433,619, filed on Dec. 19, 2022, provisional application No. 63/433,627, filed on Dec. 19, 2022.

(51) Int. Cl.
*G06F 40/30* (2020.01)
*G06N 3/0475* (2023.01)

(52) U.S. Cl.
CPC ........... *G06F 40/30* (2020.01); *G06N 3/0475* (2023.01)

(58) Field of Classification Search
None
See application file for complete search history.

(56) References Cited

U.S. PATENT DOCUMENTS

| | | | |
|---|---|---|---|
| 10,171,656 B2 * | 1/2019 | Pullamplavil | ....... H04M 3/5133 |
| 10,950,231 B1 | 3/2021 | Kockerbeck | |
| 11,017,780 B2 | 5/2021 | Steelberg | |
| 11,095,468 B1 | 8/2021 | Pandey et al. | |
| 11,106,736 B1 | 8/2021 | Newman | |
| 11,328,368 B1 * | 5/2022 | Labrie | .................... G06N 20/00 |
| 11,443,164 B2 | 9/2022 | Dalli | |
| 11,573,993 B2 | 2/2023 | Nelson et al. | |

(Continued)

OTHER PUBLICATIONS

Notice of Allowance mailed on Feb. 12, 2025, in U.S. Appl. No. 18/129,758, 05 pages.

(Continued)

*Primary Examiner* — Quynh H Nguyen

(57) ABSTRACT

Aspects of the present disclosure relate to systems and methods for generating one or more prompts based on an input and the semantic context associated with the input. In examples, the prompts may be provided as input to one or more general ML models to provide a semantic context around the input and/or output of the model. The prompt simulates training and fine-tuned specialization of the general ML model without the need to use a fine-tuning process to actually train the general ML model into a fine-tuned state. Additionally, the model output may be evaluated for responsiveness to the input prior to being returned to the user. An advantage of the present disclosure is that it allows a general ML model to be applied to a plurality of applications without the need for expensive and time-consuming training to fine-tune the ML model.

20 Claims, 9 Drawing Sheets

(56) References Cited

U.S. PATENT DOCUMENTS

| | | | |
|---|---|---|---|
| 11,605,387 | B1 | 3/2023 | Muralitharan |
| 11,823,477 | B1 | 11/2023 | Ramezani |
| 2003/0115548 | A1 | 6/2003 | Melgar |
| 2014/0040262 | A1 | 2/2014 | Winter |
| 2016/0070911 | A1 | 3/2016 | Okereke |
| 2017/0212886 | A1 | 7/2017 | Sarikaya et al. |
| 2018/0060334 | A1 | 3/2018 | Jensen |
| 2018/0151081 | A1 | 5/2018 | Chen |
| 2019/0028520 | A1 | 1/2019 | Nawrocki |
| 2019/0384813 | A1 | 12/2019 | Mohamed |
| 2020/0133071 | A1 | 4/2020 | Dai |
| 2020/0311122 | A1 | 10/2020 | Ramamurthy et al. |
| 2020/0311162 | A1 | 10/2020 | Xu et al. |
| 2020/0403817 | A1 | 12/2020 | Daredia et al. |
| 2021/0109769 | A1 | 4/2021 | Chenguang |
| 2021/0117479 | A1 | 4/2021 | Liu |
| 2021/0182341 | A1 | 6/2021 | Mullins |
| 2021/0224336 | A1 | 7/2021 | Bright |
| 2021/0271707 | A1 | 9/2021 | Lin |
| 2021/0303638 | A1 | 9/2021 | Zhong et al. |
| 2021/0342711 | A1 | 11/2021 | Mokeev et al. |
| 2022/0100831 | A1 | 3/2022 | Moreno |
| 2022/0101861 | A1 | 3/2022 | Antos |
| 2022/0198156 | A1 | 6/2022 | Rao |
| 2022/0199079 | A1 | 6/2022 | Hanson |
| 2022/0200934 | A1 | 6/2022 | Dutta |
| 2022/0342900 | A1 | 10/2022 | Basu |
| 2022/0358713 | A1 | 11/2022 | Krishnamurthy |
| 2022/0385758 | A1 | 12/2022 | Tadesse et al. |
| 2023/0035076 | A1 | 2/2023 | Wang |
| 2023/0111517 | A1 | 4/2023 | Anderson |
| 2023/0115420 | A1 | 4/2023 | Dabas |
| 2023/0135179 | A1 | 5/2023 | Mielke |
| 2023/0139347 | A1* | 5/2023 | Bondarenko ........... G06F 40/30 704/9 |
| 2023/0142718 | A1 | 5/2023 | Asgekar |
| 2023/0153641 | A1 | 5/2023 | Manda et al. |
| 2023/0153700 | A1 | 5/2023 | Lindgren |
| 2023/0155903 | A1 | 5/2023 | Song |
| 2023/0386469 | A1* | 11/2023 | Horton ................... G06V 40/18 |
| 2024/0078376 | A1 | 3/2024 | Li |
| 2024/0136070 | A1 | 4/2024 | El Saadawi |
| 2024/0201959 | A1 | 6/2024 | Callegari |
| 2024/0202173 | A1 | 6/2024 | Schillace |
| 2024/0202215 | A1 | 6/2024 | Shashanka |
| 2024/0202451 | A1 | 6/2024 | Schillace |
| 2024/0202460 | A1 | 6/2024 | Schillace |
| 2024/0202582 | A1 | 6/2024 | Schillace |
| 2024/0202584 | A1 | 6/2024 | Schillace |
| 2024/0205037 | A1 | 6/2024 | Callegari |

OTHER PUBLICATIONS

"Long-term Memory for AI," Vector Database for Vector Search, Pinecone Systems, Inc., retrieved from: https://www.pinecone.io/, Mar. 27, 2023, 10 pages.

Anonymous: "Is there way to submit a table as an JSON file?", Aug. 19, 2022, Retrieved from the Internet: URL: https://web.archive.org/web/20220819203852/https://community.openai.com/t/is-there-way-to-submit-a-table-as-an-json-file/5299, 1 page.

Anonymous: "OpenAI—Spreadsheet creator", Aug. 19, 2022, XP093140385, Retrieved from the Internet: URL: https://platform.openai.com/examples/default-spreadsheet-gen, 1 page.

Anonymous: "Skill Chaining—Wikipedia, the free encyclopedia", Nov. 27, 2015, Retrieved from the Internet: URL: https://web.archive.org/web/20151127070537/https://en.wikipedia.org/wiki/Skill_chaining, 1 page.

Beaumont, Romain., "Semantic search with embeddings: index anything", Dec. 1, 2020, Retrieved from the Internet: URL: https://web.archive.org/web/20221212165434/https://rom1504.medium.com/ semantic-search-with-embeddings-index-anything-8fb18556443c, retrieved on Jan. 26, 2024, 27 pages.

Fukamizu, et al., "Generation High resolution 3D model from natural language by Generative Adversarial Network", Arxiv.org, Cornell University Library, 201 Olin Library Cornell University Ithaca, NY 14853, Jan. 22, 2019, 9 pages.

Holovaty, Adrian: "Adventures in generating music via ChatGPT text prompts", Dec. 1, 2022, Retrieved from the Internet: URL: https://web.archive.org/web/20221217201750/https://www.holovaty.com/writing/chatgpt-music-generation/, 10 pages.

International Search Report and Written Opinion received for PCT Application No. PCT/US2023/081261, mailed on Feb. 12, 2024, 15 pages.

International Search Report and Written Opinion received for PCT Application No. PCT/US2023/081303, mailed on Mar. 26, 2024, 15 pages.

International Search Report and Written Opinion received for PCT Application No. PCT/US2023/081323, mailed on Mar. 13, 2024, 17 pages.

International Search Report and Written Opinion received for PCT Application No. PCT/US2023/081342, mailed on Mar. 26, 2024, 14 pages.

Kan, "Not All Vector Databases Are Made Equal," Towards Data Science, Oct. 2, 2021, retrieved from: https://towardsdatascience.com/milvus-pinecone-vespa-weaviate-vald-gsi-what-unites-these-buzz-words-and-what-makes-each-9c65a3bd0696, Mar. 27, 2023, 15 pages.

Konidaris, et al., "Skill Discovery in Continuous Reinforcement Learning Domains using Skill Chaining", Dec. 10, 2009, Retrieved from the Internet: URL: https://proceedings.neurips.cc/paper_files/paper/2009/file/e0cf1f47118daebc5b162 69099ad7347-Paper.pdf, 9 pages.

Magnani, et al., "Semantic Retrieval at Walmart", Proceedings of the 59th ACM/IEEE Design Automation Conference, ACMPUB27, New York, NY, USA, Aug. 14, 2022, pp. 3495-3503.

Non-Final Office Action mailed on May 8, 2024, in U.S. Appl. No. 18/129,758, 21 pages.

T, Vincent., "GPT-3 And Code Generation -AI-enabled Instant Software Development", Jan. 12, 2021, retrieved from the Internet: URL: https://becominghuman.ai/gpt-3-and-cod e-generation-ai-enabled-instant-software-development-270795077cbd, 10 pages.

International Search Report and Written Opinion received for PCT Application No. PCT/US2023/082379, Apr. 22, 2024, 12 pages.

Notice of Allowance mailed on Aug. 27, 2024, in U.S. Appl. No. 18/129,758, 12 pages.

Notice of Allowability mailed on Dec. 4, 2024, in U.S. Appl. No. 18/129,758, 5 pages.

Non-Final Office Action mailed on Mar. 20, 2025, in U.S. Appl. No. 18/129,697, 08 pages.

Chan Irene, "How to Create Meetings Summaries with OpenAI GPT -3", Dec. 16, 2022, 04 pages.

International Search Report and Written Opinion received for PCT Application No. PCT/US2023/081271, Mar. 13, 2024, 12 pages.

Non-Final Office Action mailed on Sep. 10, 2024, in U.S. Appl. No. 18/122,563, 27 pages.

International Search Report and Written Opinion received for PCT Application No. PCT/US2023/081254, Apr. 10, 2024, 10 pages.

International Search Report and Written Opinion received for PCT Application No. PCT/US2023/081290, Mar. 11, 2024, 17 pages.

Final Office Action mailed on Jan. 3, 2025, in U.S. Appl. No. 18/122,563, 31 pages.

Non-Final Office Action mailed on Jan. 16, 2025, in U.S. Appl. No. 18/129,668, 22 pages.

Final Office Action mailed on Jul. 2, 2025, in U.S. Appl. No. 18/129,668, 26 pages.

International Preliminary Report on Patentability (Chapter I) received for PCT Application No. PCT/US2023/082379, mailed on Jul. 3, 2025, 8 pages.

International Preliminary Report on Patentability Chapter 1 received for PCT Application No. PCT/US2023/081271, mailed on Jul. 3, 2025, 08 pages.

International Preliminary Report On Patentability received for PCT Application No. PCT/US2023/081254, mailed on Jul. 3, 2025, 06 pages.

(56) References Cited

OTHER PUBLICATIONS

International Preliminary Report on Patentability received for PCT Application No. PCT/US2023/081261, mailed on Jul. 3, 2025, 09 pages.
International Preliminary Report on Patentability received for PCT Application No. PCT/US2023/081290, Jul. 3, 2025, 15 pages.
International Preliminary Report on Patentability received for PCT Application No. PCT/US2023/081303, mailed on Jul. 3, 2025, 10 pages.
International Preliminary Report On Patentability received for PCT Application No. PCT/US2023/081323, mailed on Jul. 3, 2025, 11 pages.
International Preliminary Report on Patentability received for PCT Application No. PCT/US2023/081342, mailed on Jul. 3, 2025, 09 pages.
Non-Final Office Action mailed on Apr. 15, 2025, in U.S. Appl. No. 18/129,783, 40 pages.
Notice of Allowance mailed on Apr. 30, 2025, in U.S. Appl. No. 18/122,563, 14 pages.
Notice of Allowance mailed on Aug. 19, 2025, in U.S. Appl. No. 18/129,697 11 Pages.

\* cited by examiner

PROMPT GENERATION SIMULATING FINE-TUNING FOR A MACHINE LEARNING MODEL

CROSS-REFERENCE TO RELATED APPLICATIONS

This application claims priority to U.S. Provisional Application No. 63/442,540, titled "Prompt Generation Simulating Fine-Tuning For a Machine Learning Model," filed on Feb. 1, 2023, U.S. Provisional Application No. 63/433,619, titled "Storing Entries in and Retrieving information From an Embedding Object Memory," filed on Dec. 19, 2022, and U.S. Provisional Application No. 63/433,627, titled "Multi-Stage Machine Learning Model Chaining," filed on Dec. 19, 2022, the entire disclosures of which are hereby incorporated by reference in their entirety.

BACKGROUND

Applications for machine learning (ML) models are varied and continually increasing as time progresses. Indeed, there seem to be few aspects of life where innovations utilizing a ML model are not occurring. However, general ML models often require training on a specific training data set to be effective in a specific situation or for a specific industry. Without training, the ML model may be unable to produce relevant, repeatable, and consistent results for the user. While it is possible to train a general ML model, the training process can be very expensive and time-consuming which may restrict the timeliness of employing the fine-tuned ML model in a particular application. In some instances, cost and time-constraints may make it unlikely that a fine-tuned ML model can be utilized, which constrains innovative potential.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to systems and methods for generating one or more prompts based on an input and the semantic context or task associated with the input. In examples, the prompts may be provided as input to one or more ML models, such as a generative large language model (LLM), to provide a semantic context around the input and/or output of the model. The prompts simulate training and fine-tuned specialization of the general ML model without the need to use a fine-tuning process to train the general ML model to perform specific tasks. Additionally, the model output may be evaluated for responsiveness to the input prior to being returned to the user. One advantage, among others, of the present disclosure is that it allows a general ML model to be applied to perform a plurality of tasks without the need for expensive and time-consuming training to fine-tune the ML model.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Figure 1:
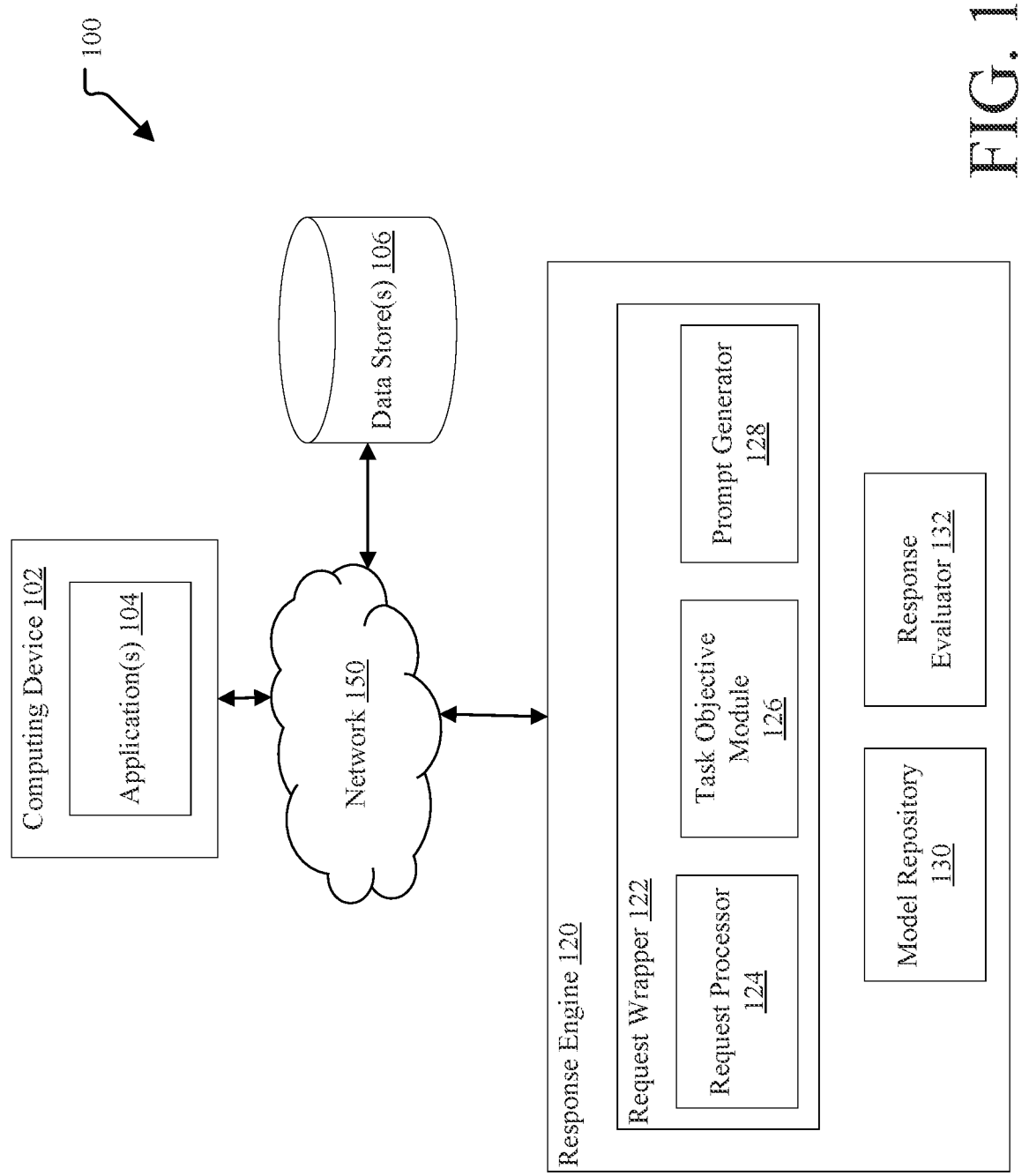
FIG. 1 is a diagram illustrating a system for generating one or more prompts for a machine learning model to generate model output, according to aspects described herein.

FIG. 1 is a diagram illustrating a system 100 for generating one or more prompts for a machine learning model, according to aspects described herein. In examples, system 100 includes a computing device 102, one or more data stores 106, a response engine 120, and a communication network 150. The computing device 102 may include one or more applications 104. The response engine 120 may include a request wrapper 122, a model repository 130, and a response evaluator 132. The request wrapper 122 may include a request processor 124, a task objective module 126, and a prompt generator 128. The applications 104 and data stores 106 are referenced as a plurality because in some embodiments it may be preferable to include more than one of these elements to accommodate different kinds and quantities of applications. However, for ease of discussion, the description herein refers to each element in the singular, but features and examples of each are applicable to a plurality of instances and embodiments.

The computing device 102, application 104, data store 106, response engine 120, request wrapper 122, request processor 124, task objective module 126, prompt generator 128, model repository 130, and response evaluator 132 communicates via the network 150. The network 150 may comprise one or more networks such as local area networks (LANs), wide area networks (WANs), enterprise networks, the Internet, etc. and may include one or more of wired, wireless, and/or optical portions.

The computing device 102 may be any of a variety of computing devices, including, but not limited to, a mobile computing device, a laptop computing device, a tablet computing device, a desktop computing device, and/or a virtual reality computing device. Computing device 102 may be configured to execute one or more application(s) 104 and/or services and/or manage hardware resources (e.g., processors, memory, etc.), which may be utilized by users of the computing device 102. The application(s) 104 may be a native application or a web-based application. The application(s) 104 may operate substantially locally to the computing device 102 or may operate according to a server/client paradigm in conjunction with one or more servers (not shown). The application 104 may be used for communication across the network 150 to provide input and to receive and view the output from the request engine 120.

In an example, input may be provided at a computing device 102 and/or application 104 and transmitted to the response engine 120 for the purpose of producing model output responsive to the input. In examples, the input may be received, for example, in a chat function of application(s) 104 used for interacting with a ML model, such as a generative large language model (LLM), in model repository 130. In some aspects, the input may be a natural language (NL) input provided as speech input, textual input, and/or as any of a variety of other inputs (e.g., text-based, images, video, etc.) via the input devices of the computing device 102 (e.g., microphone, camera, keyboard, uploading an image or video from local storage or data store 106, etc.) which are not pictured in FIG. 1. Alternatively, input may be programmatically generated by application 104, may be based on the content of a file or an electronic communication, may comprise an image, other data type, and/or a plurality of other examples which will be understood by one having skill in the art. In some instances, the input may reference previously created entities or known entities (e.g., as may be stored within data store 106). It will be appreciated that the input need not be in a particular format, contain proper grammar or syntax, or include a complete description of the model output that the user intends the ML model to generate. While the amount of detail provided with the input may improve the resulting model output, sparse input is sufficient.

The request wrapper 122 functions to receive the input, generate a task request, determine one or more task objectives based on the input and task request, and generate one or more prompts for an ML model based on the task objectives, task request, and/or input. The request processor 124 receives the input and analyzes it to determine a task request based on the input. The task request may be comprised of one or more sub-tasks that may be sequenced into a task request which can be processed by an ML model. In some examples, the request processor 124 may utilize one or more NL processing tools, rule-based analysis, and/or ML models to determine a task request based on one or more portions of the input. In examples, the request wrapper may be a software object that abstracts an ML model and exposes the ML model in a manner that give the perception that the ML model is trained or tuned for a particular purpose or task.

Additionally, the request processor 124 may also evaluate the task request in conjunction with the input and task objective once it has been generated to evaluate if a portion or all of the task request is a known task request. Known portions of the task request may have one or more associated prompts stored in the data store 106, and/or the general ML model may be able to process the task request directly without requiring a prompt. If a known prompt is required, the request processor 124 may retrieve the known prompt from data store 106, parameterize the known prompt based on user specific and/or session specific context, and pass the known prompt to the ML model for processing the task request. In some examples where multiple known prompts are retrieved, they may be chained appropriately to handle the request. If an additional prompt is not required, the request processor 124 may pass the known task request to the ML model for processing the task request.

Further, the request processor 124, may store one or more of the task request, task objective, prompts, prompt templates, and model output in data store 106 as semantic context and/or known entities which may be utilized for subsequent inputs. Additionally, the request processor may provide the model output to the application 104 after it is generated and/or evaluated by the response evaluator 132. In examples, request processor 124 may be a machine learning model trained to identify specific tasks or intents, a rules-based process to identify tasks based upon the received input, or any other type of application or process capable of parsing and analyzing input to determine tasks, requests, and/or intent based upon the input.

A task objective module 126, receives the task request and determines a task objective of the task request. Once determined, the task objective encapsulates the general intent, requested task, and/or specific meaning of the input and may be utilized to assist in generating one or more prompts specifically related to that objective. To determine the task objective, the task objective module 126, analyzes one or both of the input and task request. In an example, the task objective module 126 may use a rules-based approach wherein the input and task request are analyzed based on a series of rules to determine the task objective. In another aspect, a semantic encoding model may be utilized to determine the semantic context associated with the intent and task request and determine the task objective. The semantic encoding model may determine one or more semantic portions of the input and task request and processes the semantic portions to generate an overall task objective which describes the intent underlying the input. For example, if a user's task request is "tell me about my recent work filings on semantic memory" the ML model may not have been fine tuned to have context related to the user's work communications. However, the semantic encoding model may suitably retrieve relevant emails, summarize them, and automatically inject them into the task objective for a prompt as context for the ML model. In this way, the ML model gains necessary context to know about the user's work communications and provide a more complete and relevant output in response to the task request. In a further example, natural language (NL) processing tools may analyze the input and task request to determine task objective based on the language used in both. In an example, the task objective may be determined by an application that processes the input and task request. In an additional embodiment, one or more embeddings may be utilized to determine the task objective. An embedding may be generated for the input and task request jointly, such that a single embedding describes both, or an embedding may be generated singularly and/or for one or more portions of each of the input and task request based on the granularity desired within the system. The embeddings may then be utilized to identify semantically associated task objectives from a data store such as data store 106 which is configured as an embedding object memory. The semantically associated task objectives may then be analyzed and refined to determine a task objective for the input.

The prompt generator 128, receives the task objective and task request and utilizes them to generate one or more prompts for the ML model. The prompt generator 128 may generate one or more prompts that when processed a ML model, such as a generative large language model (LLM), provide sufficient context for the ML model to generate model output responsive to the task objective associated with the input. That is, the generated prompts enable a ML model to comprehend the context surrounding an input that has a task objective and task request (e.g., intent or specific meaning) previously unknown to the general ML model utilized from the model repository 130. Thus, the one or more prompts encompass the semantic context of the task objective and task request so that the ML model can generate model output responsive to the requested task and/or intent without requiring additional training or fine-tuning of the model prior to generating model output responsive to the task or intent. It will be appreciated that a prompt may be comprised of a plurality of prompt templates. A prompt template may include any of a variety of data, including, but not limited to, natural language, image data, audio data, video data, and/or binary data, among other examples. In examples, the type of data may depend on the type of ML model that will be leveraged to respond to the received input. One or more fields, regions, and/or other parts of the prompt may be populated with one or more prompt templates encompassing input and/or context, thereby generating a prompt that can be processed by an ML model of the model repository 130 according to aspects described herein.

In an additional example, a prompt template includes known entities that were previously created or input to the system 100, thereby enabling a user to reference previously created model output and/or any of a variety of other content. For example, data store 106 may include one or more embeddings associated with previously generated model output and/or previously processed input, thereby enabling semantic retrieval of the prompt template and associated context (e.g., such that previously generated model output may be iterated upon).

In some aspects, the prompt generator 128 may utilize the one or more prompts in place of the input to the ML model. In another example, the prompt generator 128 may provide the one or more prompts in addition to the input. The prompts may be generated in a variety of ways. In one example, an application and/or ML model from model repository 130 may analyze the task objective and input to select from one or more prompt templates stored in data store 106 with which to populate the prompt. In an alternative example, NL processing tools may be utilized to analyze the input and task objective to determine one or more associated prompt templates and/or populate a prompt. In a further example, the prompt generator 128 may use the ML model directly to either write a prompt, rewrite a prompt, and/or expand a seed prompt to determine one or more associated prompt templates and/or populate a prompt.

In another aspect, the prompt generator 128 may associate one or more pre-configured prompt templates with at least a portion of the intent and task request and populate each prompt template to generate one or more prompts accordingly. The prompt templates may contain code and/or instructions to trigger the recall and/or retrieval of semantic information which may be injected into a prompt to encapsulate the specific context that the ML model needs to generate model output in response to the input. The one or more prompt templates may be retrieved from data store 106, by the prompt generator 128. In another example, an embedding may be generated for the input and/or task request singularly and/or collectively. The one or more embeddings may be stored in a data store 106 for future use. The semantically associated prompt templates are used to generate one or more prompts which will be processed by one or more ML models from the model repository 130. In further embodiments, a ML model stored in model repository 130 may be trained to output prompts. The trained ML model may be utilized to process the intent and task objective and output one or more prompts responsive to the input.

The prompts may be provided as input to one or more ML models in the model repository 130 to generate a model output responsive to the input. Model repository 130 may include any of a variety of ML models. A generative model used according to aspects described herein may generate any of a variety of output types (and may thus be a multimodal generative model, in some examples) and may be a generative transformer model, a large language model (LLM), and/or a generative image model, among other examples. Example ML models include, but are not limited to, Generative Pre-trained Transformer 3 (GPT-3), BigScience BLOOM (Large Open-science Open-access Multilingual Language Model), DALL-E, DALL-E 2, Stable Diffusion, or Jukebox. Additional examples of such aspects are discussed below with respect to the generative ML model illustrated in FIGS. 5A-5B. Additionally or alternatively, one or more recognition models (or any of a variety of other types of ML models) may produce their own output that is processed according to aspects described herein. Additionally, the model repository may contain one or more ML models that are user specific, meaning they have been trained on information specifically related to a certain user (e.g., chat history, browsing history, purchase history, previous inputs, user preferences from an online profile, other data relating specifically to the user, etc.)

Response evaluator 132 may process the model output to determine if it is responsive to the input. The response evaluator 132 may evaluate the model output, which may include any of a variety of types of content (e.g., text, images, programmatic output, code, instructions for a 3D printed object, etc.) which may be returned to the user, executed, parsed, and/or otherwise processed (e.g., as one or more API calls or function calls) to verify functionality. In some aspects, the model output may be unresponsive based on a determination that the model output not meeting or exceeding a predetermined responsiveness threshold based on a generated score for the response, an indication of an error with the model output, and/or processing of at least a part of the model output fails (e.g., as may be the case when the model output includes code or other output that is determined to be syntactically or semantically incorrect), among other examples. In some aspects, if the model output is determined to be unresponsive to the input, the response evaluator 132 may reinitiate the process for generating the model output such that another model output is created before a response is returned to the application 104, such that the system may generate multiple potential model outputs prior to returning a response to the application 104. For example, the prompt generator 128 may call the ML model with a generated prompt and additionally with embedded questions asking the ML model to indicate if it would benefit from more context to provide model output, more information to provide model output, and/or to respond if some aspect of the prompt is not clear. If the ML model would benefit from additional context, information, and/or greater clarity the ML model may provide intermediate output including one or more requests for additional lookup by the prompt generator 128, retrieval of additional context, information, prompt templates, etc., and/or other instructions for producing model output. In this way the ML model can generate intermediate output with these requests as opposed to the user receiving unresponsive output and having to determine through trial and error what could improve the ML model output. Once the additional context/information is gathered, an updated prompt will be generated by the prompt generator 128 and the ML model may then process the updated prompt based on its own request. In some examples, the ML model may place the requested context/information into a context store for a follow up call. Once the ML model has received sufficient additional information, prompt templates, context, etc. it may produce a final output that the response evaluator 132 will determine is responsive to the input and return the final output to the user. In this way, the model can improve response success rate. In other aspects, the response evaluator 132 may provide a failure indication to the user, for example indicating that the user may retry or reformulate the input, that the input was not correctly understood, or that the requested functionality may not be available.

In aspects, the computing device 102 may be any device that can receive, process, modify, and communicate content on the network 150. Examples of a computing device 102 include a mobile computer or mobile computing device (e.g., a Microsoft® Surface® device, a laptop computer, a notebook computer, a tablet computer, a netbook, etc.), a stationary computing device such as a desktop computer or PC (personal computer), telephone, mobile device, virtual reality device, gaming device, vehicle computer, and/or a wireless device. Computing device 102 may be configured to execute one or more design applications (or "applications") such as application 104 and/or services and/or manage hardware resources (e.g., processors, memory, etc.), which may be utilized by users of the computing device 102. The application 104 may be a native application or a web-based application. The application 104 may operate substantially locally to the computing device 102, or may operate according to a server/client paradigm in conjunction with one or more servers (not shown). The application 104 may be used for communication across the network 150 for the user to provide input and to receive and view the model output from the response engine 120.

The computing device 102 can receive send and receive content data as input or output which may be, for example from a microphone, a camera, a global positioning system (GPS), etc., that transmits content data, a computer-executed program that generates content data, and/or memory with data stored therein corresponding to content data. The content data may include visual content data, audio content data (e.g., speech or ambient noise), a user-input, such as a voice query, text query, etc., an image, an action performed by a user and/or a device, a computer command, a programmatic evaluation gaze content data, calendar entries, emails, document data (e.g., a virtual document), weather data, news data, blog data, encyclopedia data and/or other types of private and/or public data that may be recognized by those of ordinary skill in the art. In some examples, the content data may include text, source code, commands, skills, or programmatic evaluations.

The computing device 102 and request engine 120 may include at least one processor, such as request processor 124, that executes software and/or firmware stored in memory. The software/firmware code contains instructions that, when executed by the processor causes control logic to perform the functions described herein. The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed In accordance with some aspects, the computing device 102 and response engine 120 may have access to data contained in a data store 106 as well as the ability to store data in data store 106. The data store 106 may contain a plurality of content related to generating an output and providing data to an ML model. Data store 106 may be a network server, cloud server, network attached storage ("NAS") device, or another suitable computing device. Data store 106 may include one or more of any type of storage mechanism or memory, including a magnetic disc (e.g., in a hard disk drive), an optical disc (e.g., in an optical disk drive), a magnetic tape (e.g., in a tape drive), a memory device such as a random-access memory (RAM) device, a read-only memory (ROM) device, etc., and/or any other suitable type of storage medium. Although only one instance of the data store 106 are shown in FIG. 1, the system 100 may include two, three, or more similar instances of the data store 106. Moreover, the network 150 may provide access to other data stores similar to data store 106 that are located outside of the system 100, in some embodiments.

In some examples, the network 150 can be any suitable communication network or combination of communication networks. For example, network 150 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard), a wired network, etc. In some examples, network 150 can be a local area network (LAN), a wide area network (WAN), a public network (e.g., the Internet), a private or semi-private network (e.g., a corporate or university intranet), any other suitable type of network, or any suitable combination of networks. Communication links (arrows) shown in FIG. 1 can each be any suitable communications link or combination of communication links, such as wired links, fiber optics links, Wi-Fi links, Bluetooth links, cellular links, etc.

As will be appreciated, the various methods, devices, apps, nodes, features, etc., described with respect to FIG. 1 or any of the figures described herein, are not intended to limit the system to being performed by the particular apps and features described. Accordingly, additional configurations may be used to practice the methods and systems herein and/or features and apps described may be excluded without departing from the methods and systems disclosed herein.

Figure 2:
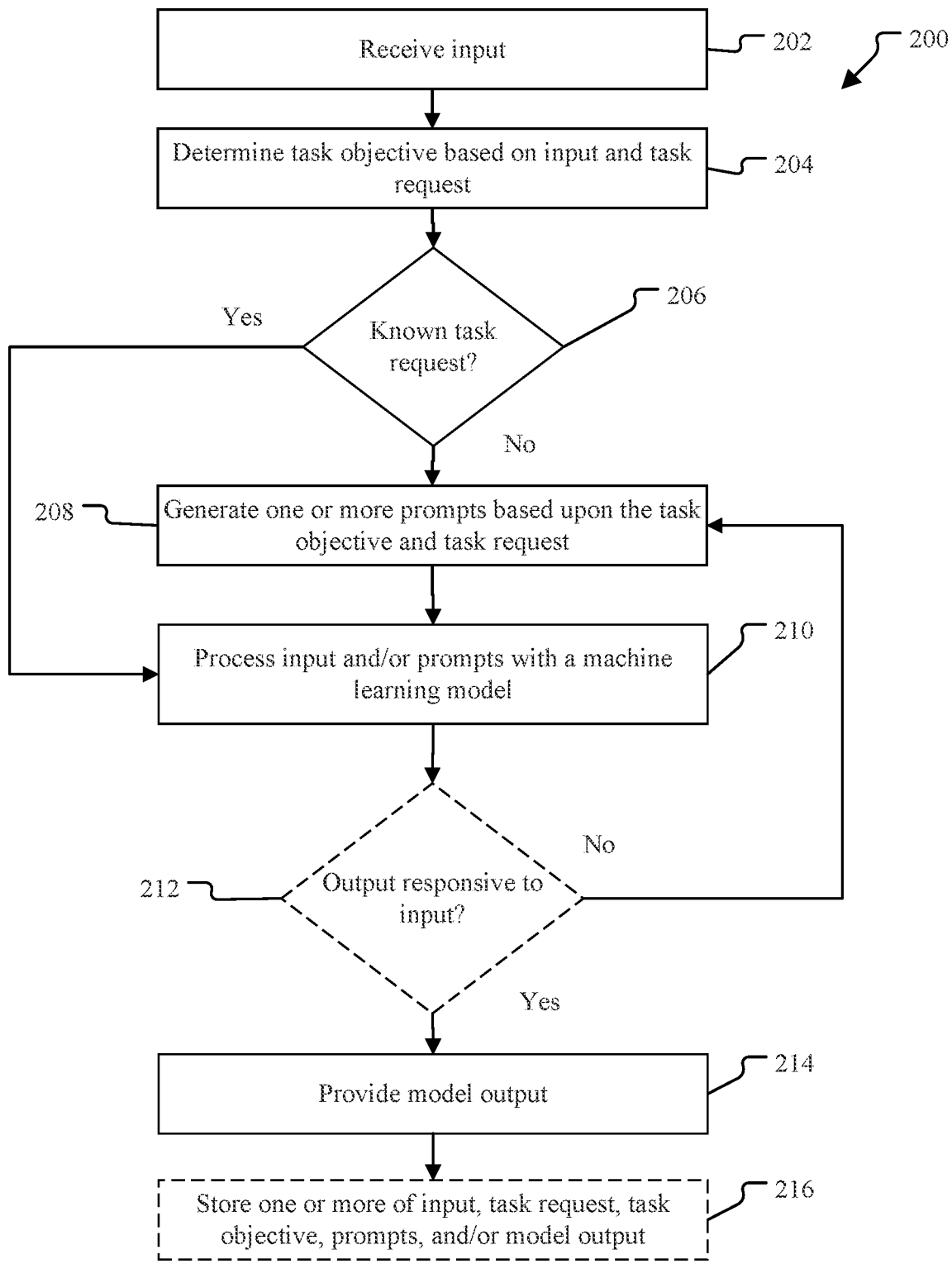
FIG. 2 is a block diagram illustrating a method for generating one or more prompts for a machine learning model to generate model output, according to aspects described herein.

FIG. 2 is a block diagram illustrating a method for generating one or more prompts for a machine learning model to generate model output, according to aspects described herein. A general order of the operations for the method 200 is shown in FIG. 2. Generally, the method 200 begins with operation 202 and ends with operation 216. The method 200 may include more or fewer steps or may arrange the order of the steps differently than those shown in FIG. 2. The method 200 can be executed as computer-executable instructions executed by a computer system and encoded or stored on a computer readable medium or other non-transitory computer storage media. Further, the method 200 can be performed by gates or circuits associated with a processor, an ASIC, an FPGA, a SOC or other hardware device. Hereinafter, the method 200 shall be explained with reference to the systems, components, devices, modules, software, data structures, data characteristic representations, signaling diagrams, methods, etc., described in conjunction with FIGS. 1, 3, 4, 5A, 5B, 6, 7, and 8.

At operation 202, input is received that corresponds to a task request. The input may be received from an application (e.g., application 104) on a computing device (e.g., computing device 102). The input may indicate a request for model output.

At operation 204, a task objective may be determined, for example, by a task objective module (e.g., task objective module 126) based on the input and task request. The task objective may encapsulate the general intent or specific meaning of the input and may be utilized to assist in generating one or more prompts specifically related to that objective.

At operation 206, a determination is made as to the task objective is a known task request. A known task request is a task request that either has a known prompt associated with it or is a task request that will not require a prompt for an ML model to generate a model output responsive to the input. An unknown task request is all other task requests that are not known task requests. The determination of known task request is based on an analysis of the input, task request, and task objective. If a task request is known then flow progresses to operation 210 where the known task request is processed as either the direct input and/or a known prompt associated with the task request. If a task request is unknown, flow progresses to operation 208 where one or more prompts are generated by a prompt generator (e.g., prompt generator 128) based upon the task objective and task request. The prompts are utilized to provide sufficient context to a general ML model so that it can generate model output responsive to the task requested based upon the input.

At operation 210, the input and/or one or more prompts are processed by a ML model, such as, for example, a generative large language model (LLM), that is part of a model repository (e.g., model repository 130). In some instances, as described above, the input may be processed individually. In other instances, the input and prompts are processed together to generate the model output. Alternatively, the prompts may be processed absent the input by the ML model. The model output may be evaluated by a response evaluator (e.g., response evaluator 132) at operation 212, to determine if it is responsive to the input. Operation 212 is shown with a dashed line to indicate the step is optional and may be omitted in certain aspects.

If the model output is not responsive, flow progresses to operation 208 where a new prompt may be generated. The new prompt may be refined either by a new method of generating a prompt and/or by broadening or narrowing the parameters of a previously used method of generating prompts, as described above. The new prompt will be input to the ML model to generate a new model output. This loop will continue until the model output is determined to be responsive to the input. If the model output is responsive flow progresses to operation 214, where the model output is provided to the user by a request processor (e.g., request processor 124).

At operation 216, one or more of the input, task request, task objective, prompts, and/or model output are stored in a data store (e.g., data store 106) by a request processor (e.g., request processor 124). Operation 216 is shown with a dashed line to indicate the step is optional and may be omitted in certain embodiments.

Figure 3:
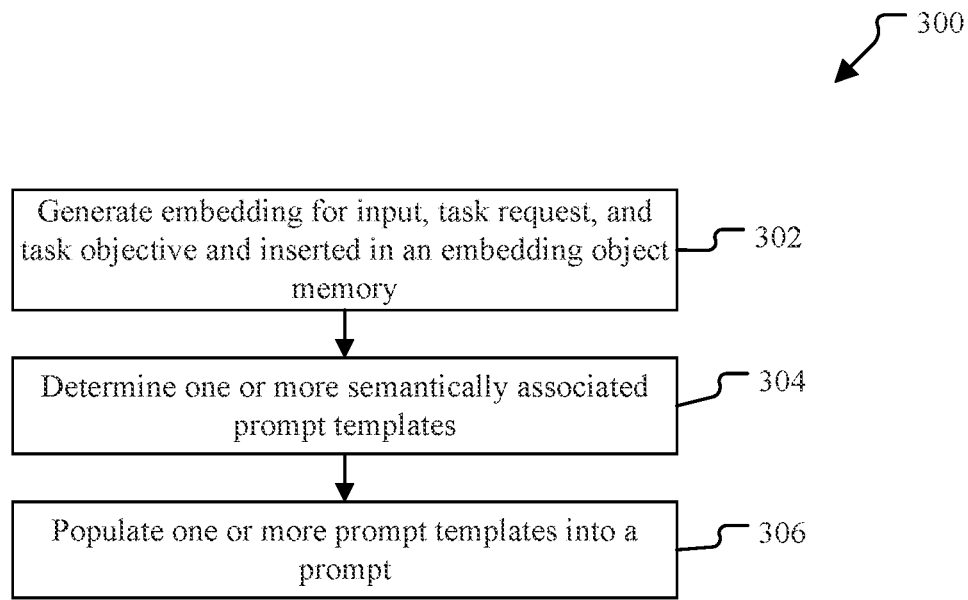
FIG. 3 is a block diagram illustrating a method for generating prompts using embeddings, according to aspects described herein.

FIG. 3 is a block diagram illustrating a method for generating prompts using embeddings, according to aspects described herein. A general order of the operations for the method 300 is shown in FIG. 3. Generally, the method 300 begins with operation 302 and ends with operation 306. The method 300 may include more or fewer steps or may arrange the order of the steps differently than those shown in FIG. 3. The method 300 can be executed as computer-executable instructions executed by a computer system and encoded or stored on a computer readable medium or other non-transitory computer storage media. Further, the method 300 can be performed by gates or circuits associated with a processor, an ASIC, an FPGA, a SOC or other hardware device. Hereinafter, the method 300 shall be explained with reference to the systems, components, devices, modules, software, data structures, data characteristic representations, signaling diagrams, methods, etc., described in conjunction with FIGS. 1, 2, 4, 5, 6, 7, and 8.

At operation 302, an embedding may be generated, for example, by a prompt generator (e.g., prompt generator 128) for the input, task request, and task objective. An embedding may be created singularly for each of the input, task request, and task objective or collectively for one or more of them. Once created the embeddings may be inserted into an embedding object memory (e.g., a data store 106 configured as an embedding object memory). At operation 304, one or more semantically associated prompt templates may be determined by a prompt generator (e.g., prompt generator 128). At operation 306, the one or more semantically associated prompt templates are populated into a prompt which will be processed by a ML model from a model repository (e.g., model repository 130).

Figure 4:
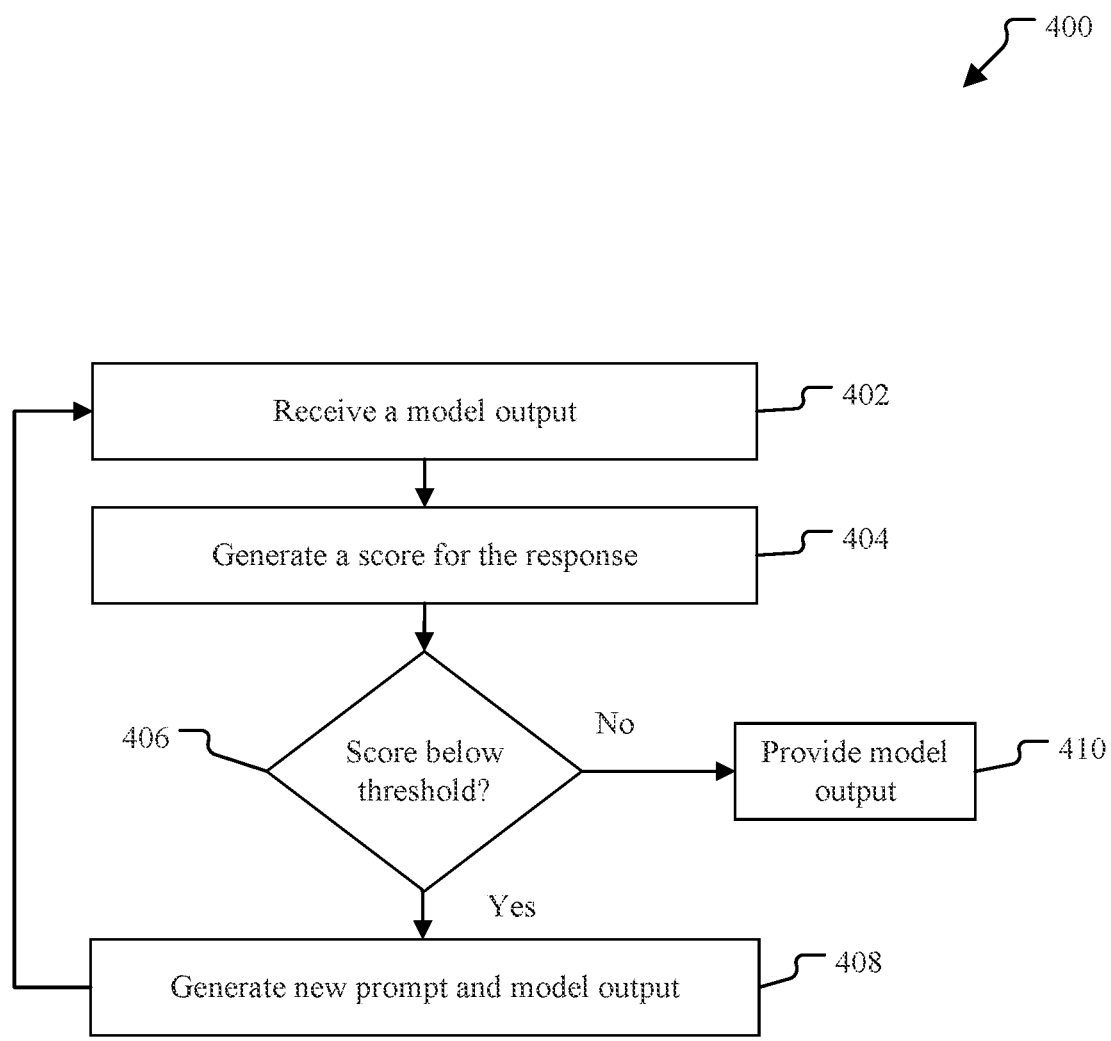
FIG. 4 is a block diagram illustrating a method of evaluating a model output for responsiveness to an input, according to aspects described herein.

FIG. 4 is a block diagram illustrating a method of evaluating a model output for responsiveness to an input, according to aspects described herein. A general order of the operations for the method 400 is shown in FIG. 4. Generally, the method 400 begins with operation 402 and ends with operation 412. The method 400 may include more or fewer steps or may arrange the order of the steps differently than those shown in FIG. 4. The method 400 can be executed as computer-executable instructions executed by a computer system and encoded or stored on a computer readable medium or other non-transitory computer storage media. Further, the method 400 can be performed by gates or circuits associated with a processor, an ASIC, an FPGA, a SOC or other hardware device. Hereinafter, the method 400 shall be explained with reference to the systems, components, devices, modules, software, data structures, data characteristic representations, signaling diagrams, methods, etc., described in conjunction with FIGS. 1, 2, 3, 5, 6, 7, and 8.

At operation 402 a model output is received by an response evaluator (e.g., response evaluator 132). At operation 404 a score may be generated for the response by the response evaluator. The score may be a determination of responsive of the model output relative to the input. At operation 406 it is determined if the score is below a threshold value, by the response evaluator. The threshold may be determined as a design choice by a system developer or it may be determined by the response evaluator based on the nature and complexity of the user input. If the score is below the threshold flow progresses to operation 408 where a new prompt and model output are generated as described above with respect to FIG. 2 operation 212, which is substantially similar. The method progresses in the loop until it is determined that the score meets or exceeds the threshold. If this occurs flow progresses to operation 410 where the model output is provided to the application (e.g., application 104) by a request processor (e.g., request processor 124).

Figure 5A:
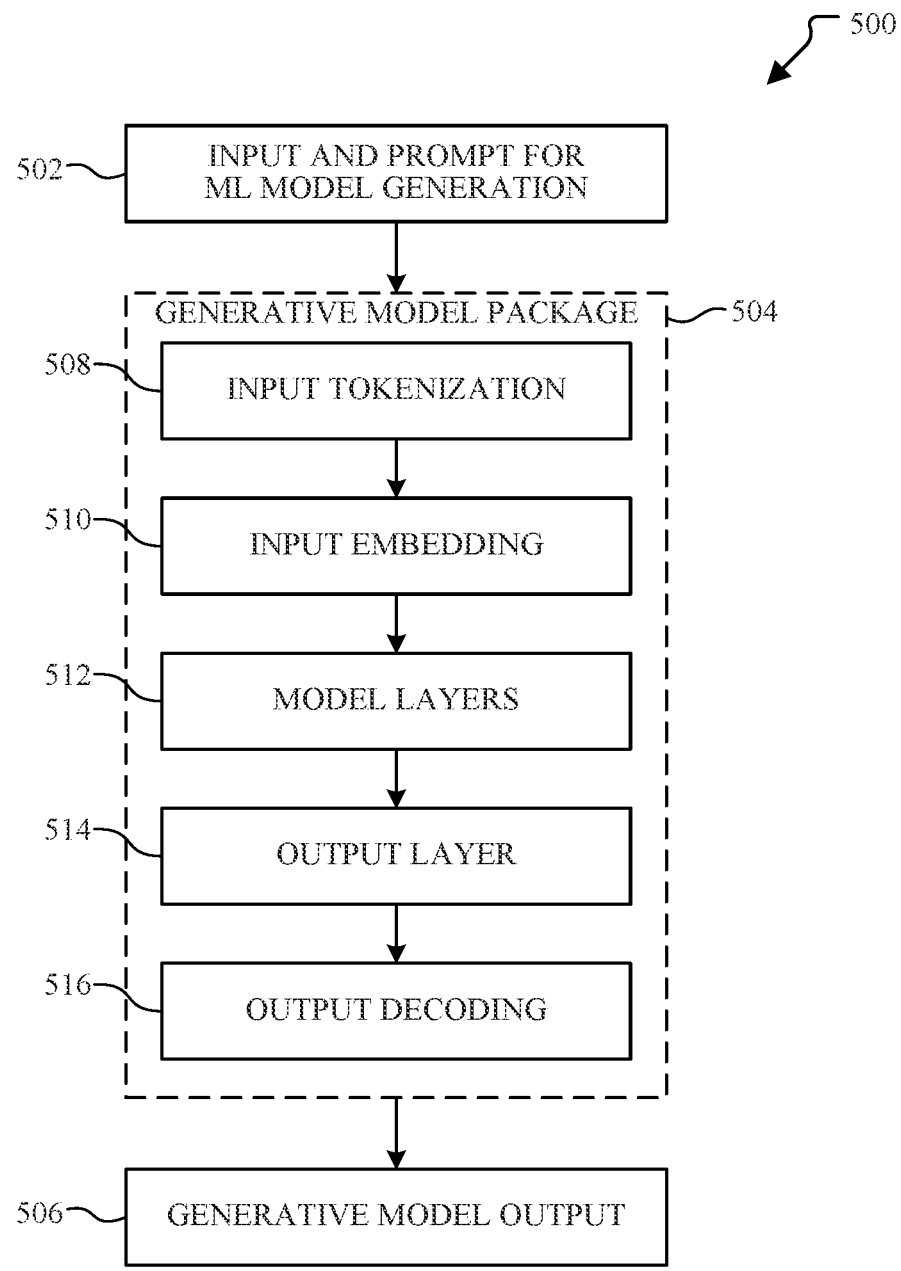
FIGS. 5A and 5B illustrate overviews of an example generative machine learning model that may be used according to aspects described herein
Figure 5B:
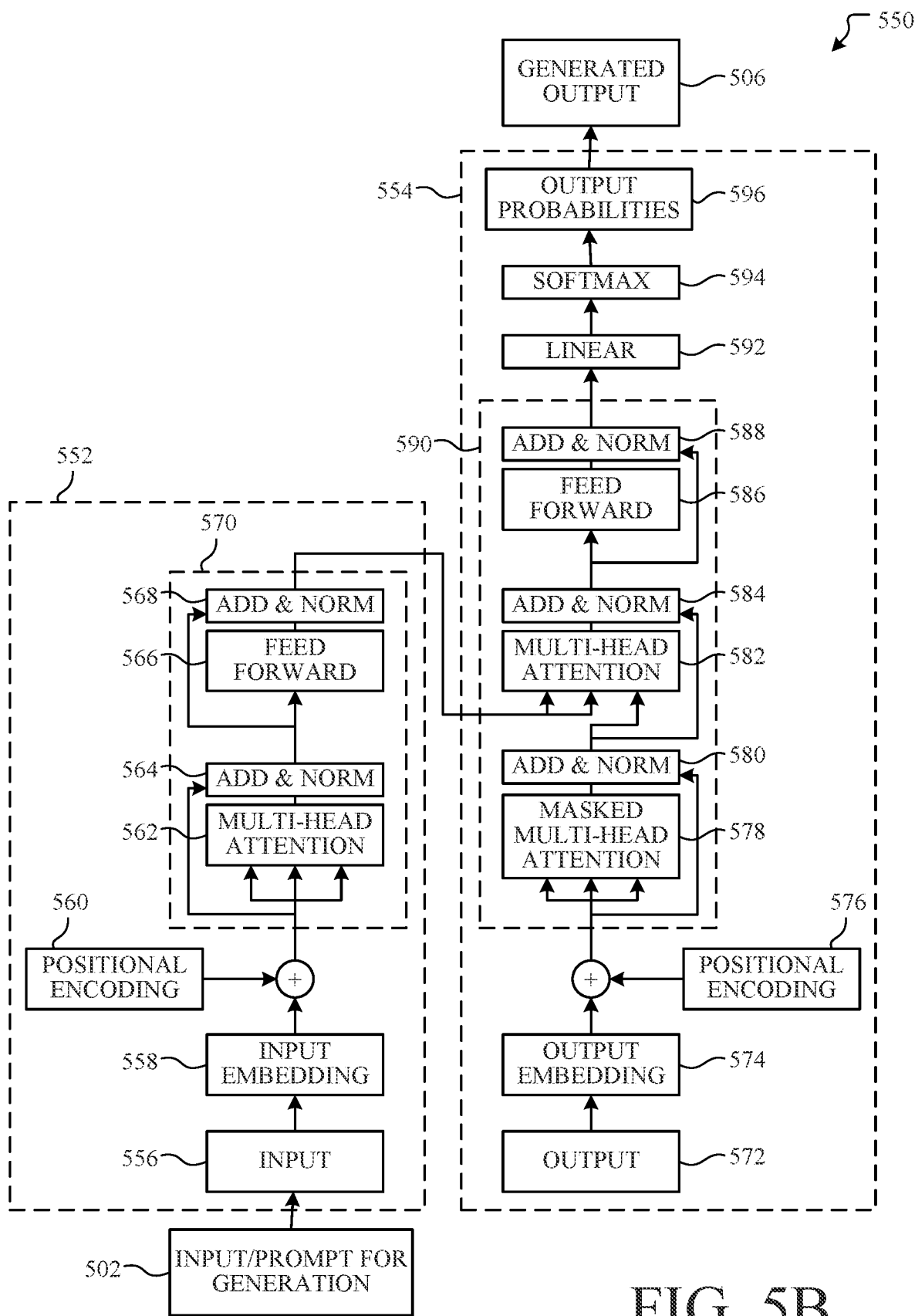

FIGS. 5A and 5B illustrate overviews of an example generative machine learning model that may be used according to aspects described herein. With reference first to FIG. 5A, conceptual diagram 500 depicts an overview of pre-trained generative model package 504 that processes an input and a prompt 502 to generate model output 506 aspects described herein. Example ML models include, but are not limited to, Generative Pre-trained Transformer 3 (GPT-3), BigScience BLOOM (Large Open-science Open-access Multilingual Language Model), DALL-E, DALL-E 2, Stable Diffusion, or Jukebox.

In examples, generative model package 504 is pre-trained according to a variety of inputs (e.g., a variety of human languages, a variety of programming languages, and/or a variety of content types) and therefore need not be finetuned or trained for a specific scenario. Rather, generative model package 504 may be more generally pre-trained, such that input 502 includes a prompt that is generated, selected, or otherwise engineered to induce generative model package 504 to produce certain generative model output 506. It will be appreciated that input 502 and generative model output 506 may each include any of a variety of content types, including, but not limited to, text output, image output, audio output, video output, programmatic output, and/or binary output, among other examples. In examples, input 502 and generative model output 506 may have different content types, as may be the case when generative model package 504 includes a generative multimodal machine learning model.

As such, generative model package 504 may be used in any of a variety of scenarios and, further, a different generative model package may be used in place of generative model package 504 without substantially modifying other associated aspects (e.g., similar to those described herein with respect to FIGS. 1, 2, 3, and 4). Accordingly, generative model package 504 operates as a tool with which machine learning processing is performed, in which certain inputs 502 to generative model package 504 are programmatically generated or otherwise determined, thereby causing generative model package 504 to produce model output 506 that may subsequently be used for further processing.

Generative model package 504 may be provided or otherwise used according to any of a variety of paradigms. For example, generative model package 504 may be used local to a computing device (e.g., computing device 102 in FIG. 1) or may be accessed remotely from a machine learning service (e.g., response engine 120). In other examples, aspects of generative model package 504 are distributed across multiple computing devices. In some instances, generative model package 504 is accessible via an application programming interface (API), as may be provided by an operating system of the computing device and/or by the machine learning service, among other examples.

With reference now to the illustrated aspects of generative model package 504, generative model package 504 includes input tokenization 508, input embedding 510, model layers 512, output layer 514, and output decoding 516. In examples, input tokenization 508 processes input 502 to generate input embedding 510, which includes a sequence of symbol representations that corresponds to input 502. Accordingly, input embedding 510 is processed by model layers 512, output layer 514, and output decoding 516 to produce model output 506. An example architecture corresponding to generative model package 504 is depicted in FIG. 5B, which is discussed below in further detail. Even so, it will be appreciated that the architectures that are illustrated and described herein are not to be taken in a limiting sense and, in other examples, any of a variety of other architectures may be used.

FIG. 5B is a conceptual diagram that depicts an example architecture 550 of a pre-trained generative machine learning model that may be used according to aspects described herein. As noted above, any of a variety of alternative architectures and corresponding ML models may be used in other examples without departing from the aspects described herein.

As illustrated, architecture 550 processes input 502 to produce generative model output 506, aspects of which were discussed above with respect to FIG. 5A. Architecture 550 is depicted as a transformer model that includes encoder 552 and decoder 554. Encoder 552 processes input embedding 558 (aspects of which may be similar to input embedding 510 in FIG. 5A), which includes a sequence of symbol representations that corresponds to input 556. In examples, input 556 includes input and prompt for generation 502 (e.g., corresponding to a skill of a skill chain).

Further, positional encoding 560 may introduce information about the relative and/or absolute position for tokens of input embedding 558. Similarly, output embedding 574 includes a sequence of symbol representations that correspond to output 572, while positional encoding 576 may similarly introduce information about the relative and/or absolute position for tokens of output embedding 574.

As illustrated, encoder 552 includes example layer 570. It will be appreciated that any number of such layers may be used, and that the depicted architecture is simplified for illustrative purposes. Example layer 570 includes two sub-layers: multi-head attention layer 562 and feed forward layer 566. In examples, a residual connection is included around each layer 562, 566, after which normalization layers 564 and 568, respectively, are included.

Decoder 554 includes example layer 590. Similar to encoder 552, any number of such layers may be used in other examples, and the depicted architecture of decoder 554 is simplified for illustrative purposes. As illustrated, example layer 590 includes three sub-layers: masked multi-head attention layer 578, multi-head attention layer 582, and feed forward layer 586. Aspects of multi-head attention layer 582 and feed forward layer 586 may be similar to those discussed above with respect to multi-head attention layer 562 and feed forward layer 566, respectively. Additionally, masked multi-head attention layer 578 performs multi-head attention over the output of encoder 552 (e.g., output 572). In examples, masked multi-head attention layer 578 prevents positions from attending to subsequent positions. Such masking, combined with offsetting the embeddings (e.g., by one position, as illustrated by multi-head attention layer 582), may ensure that a prediction for a given position depends on known output for one or more positions that are less than the given position. As illustrated, residual connections are also included around layers 578, 582, and 586, after which normalization layers 580, 584, and 588, respectively, are included.

Multi-head attention layers 562, 578, and 582 may each linearly project queries, keys, and values using a set of linear projections to a corresponding dimension. Each linear projection may be processed using an attention function (e.g., dot-product or additive attention), thereby yielding n-dimensional output values for each linear projection. The resulting values may be concatenated and once again projected, such that the values are subsequently processed as illustrated in FIG. 5B (e.g., by a corresponding normalization layer 564, 580, or 584).

Feed forward layers 566 and 586 may each be a fully connected feed-forward network, which applies to each position. In examples, feed forward layers 566 and 586 each include a plurality of linear transformations with a rectified linear unit activation in between. In examples, each linear transformation is the same across different positions, while different parameters may be used as compared to other linear transformations of the feed-forward network.

Additionally, aspects of linear transformation 592 may be similar to the linear transformations discussed above with respect to multi-head attention layers 562, 578, and 582, as well as feed forward layers 566 and 586. Softmax 594 may further convert the output of linear transformation 592 to predicted next-token probabilities, as indicated by output probabilities 596. It will be appreciated that the illustrated architecture is provided in as an example and, in other examples, any of a variety of other model architectures may be used in accordance with the disclosed aspects.

Accordingly, output probabilities 596 may thus form model output 506 according to aspects described herein, such that the output of the generative ML model defines an output corresponding to the input. For instance, model output 506 may be associated with a corresponding application and/or data format, such that model output is processed to display the output to a user and/or to fabricate a physical object, among other examples.

Figure 6:
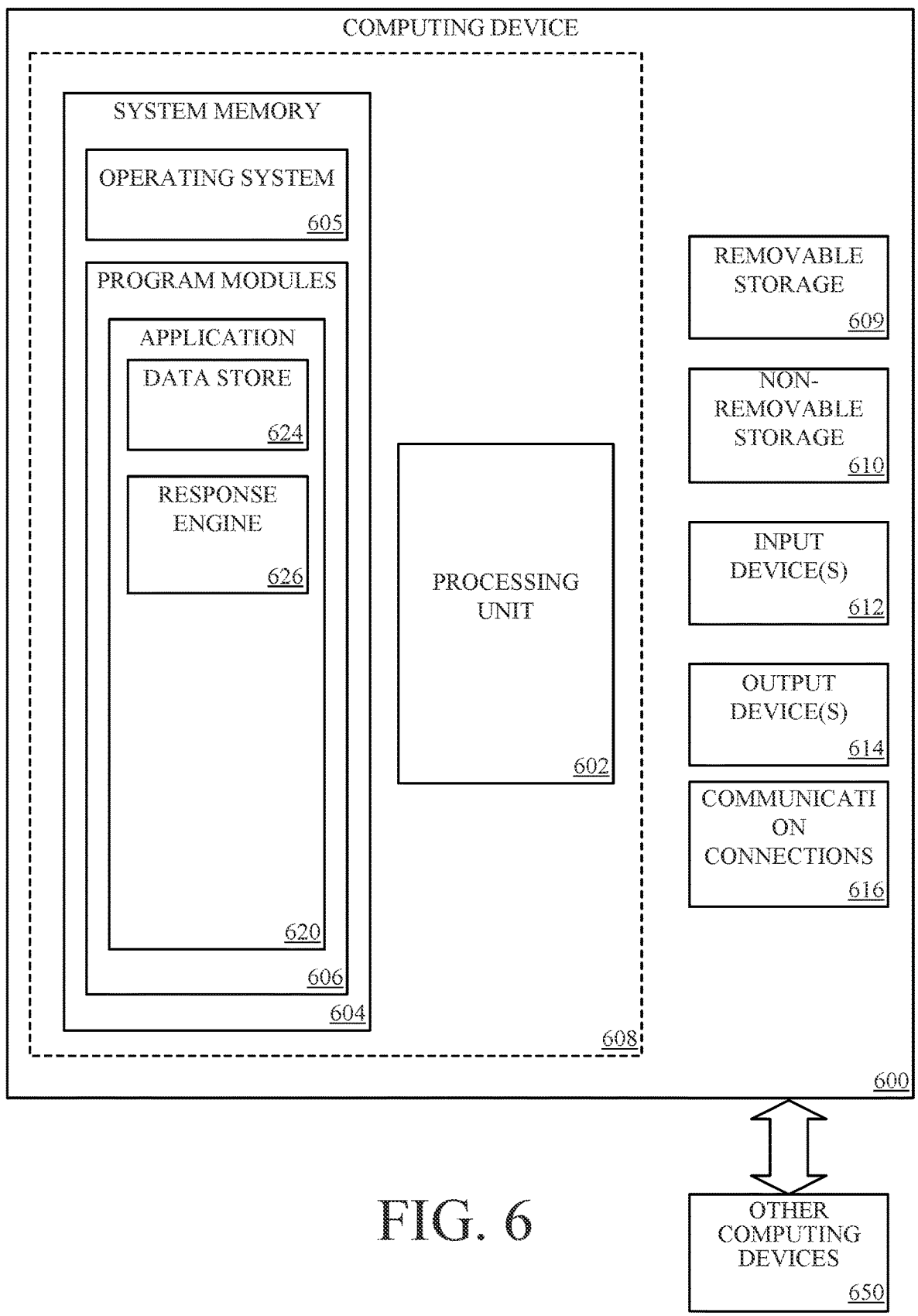
FIG. 6 illustrates a block diagram illustrating example physical components of a computing device with which aspects of the disclosure may be practiced.
Figure 7:
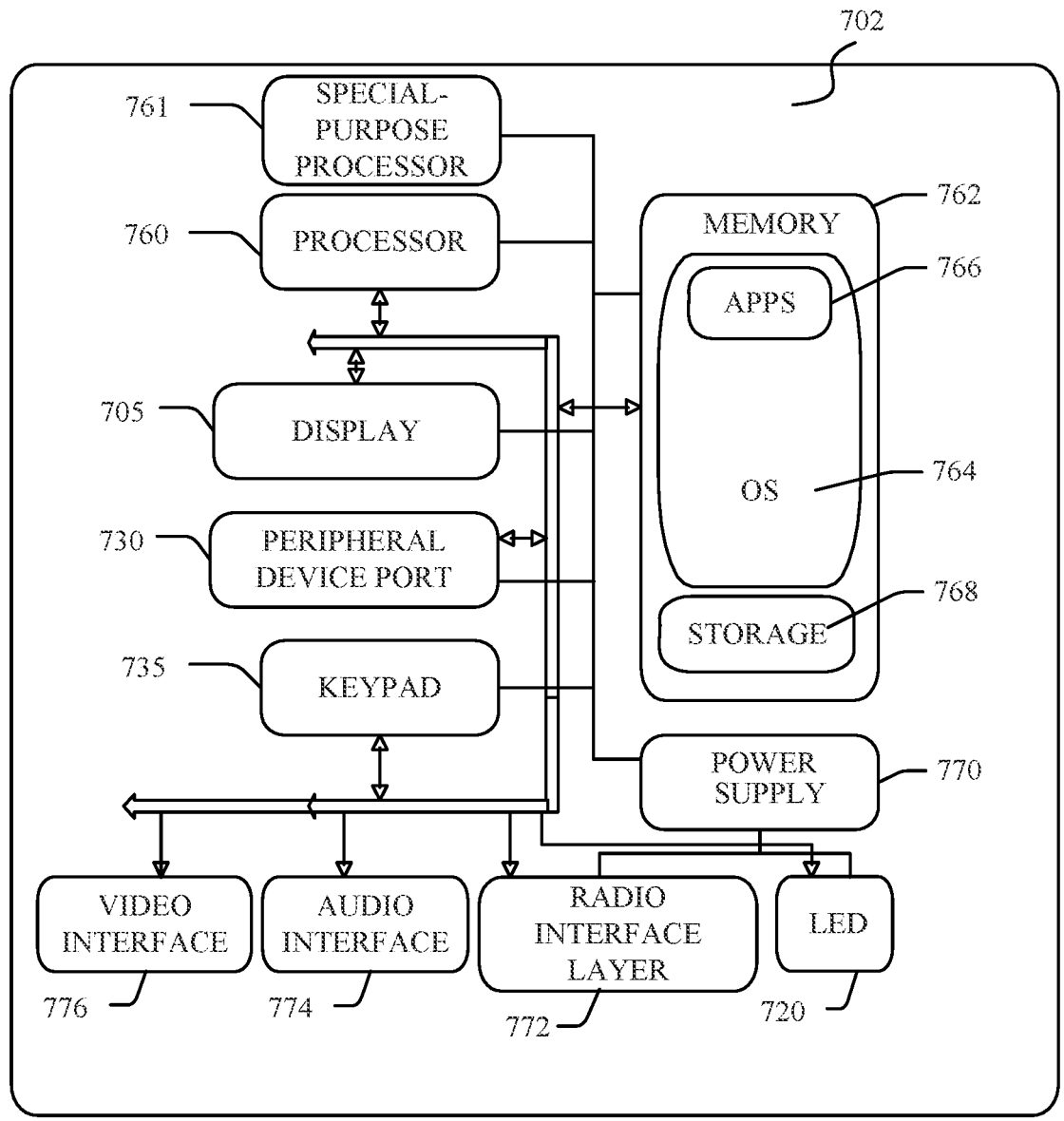
FIG. 7 illustrates a simplified block diagrams of a computing device with which aspects of the present disclosure may be practiced.
Figure 8:
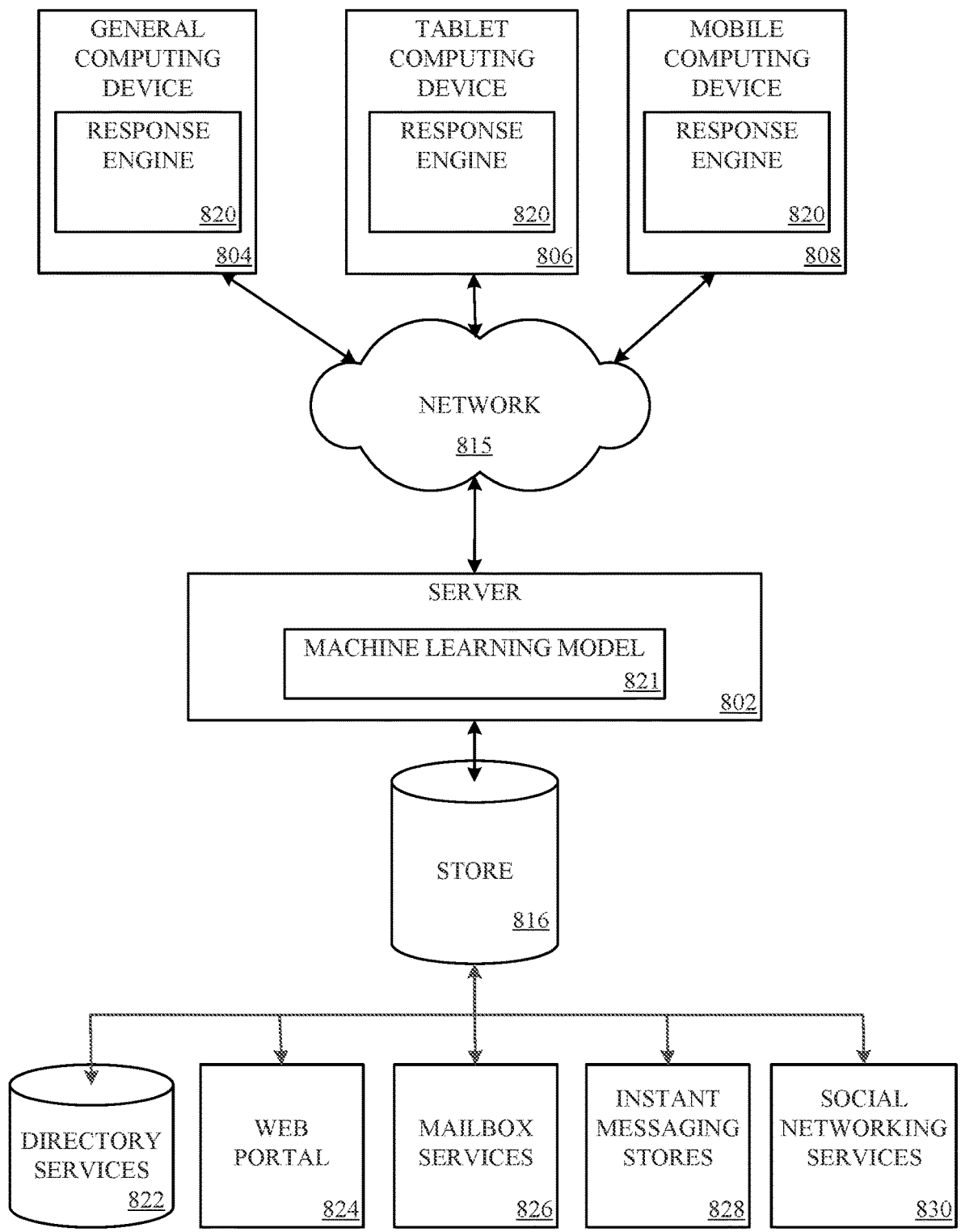
FIG. 8 is a simplified block diagram of a distributed computing system in which aspects of the present disclosure may be practiced.

FIGS. 6-8 and the associated descriptions provide a discussion of a variety of operating environments in which aspects of the disclosure may be practiced. However, the devices and systems illustrated and discussed with respect to FIGS. 6-8 are for purposes of example and illustration and are not limiting of a vast number of computing device configurations that may be utilized for practicing aspects of the disclosure, described herein.

FIG. 6 is a block diagram illustrating physical components (e.g., hardware) of a computing device 600 with which aspects of the disclosure may be practiced. The computing device components described below may be suitable for the computing devices described above, including computing device 102 in FIG. 1. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for running software application 620, such as one or more components supported by the systems described herein. As examples, system memory 604 may store embedding object memory insertion engine or component 624 and/or embedding object memory retrieval engine or component 626. The operating system 605, for example, may be suitable for controlling the operation of the computing device 600.

Furthermore, aspects of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., application 620) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Some aspects of the disclosure may also be practiced using other technologies capable of performing logical operations such as, for example, AND, OR, and NOT, including but not limited to mechanical, optical, fluidic, and quantum technologies. In addition, some aspects of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 7 is a block diagram illustrating the architecture of one aspect of a computing device. That is, the computing device can incorporate a system (e.g., an architecture) 702 to implement some aspects. In some examples, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein (e.g., an embedding object memory insertion engine, an embedding object memory retrieval engine, etc.).

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and/or special-purpose processor 761 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with aspects of the present disclosure, the microphone may also serve as an audio sensor to facilitate control of notifications, as will be described below. The system 702 may further include a video interface 776 that enables an operation of an on-board camera 730 to record still images, video stream, and the like.

A computing device implementing the system 702 may have additional features or functionality. For example, the computing device may also include additional data storage devices (removable and/or non-removable) such as, magnetic disks, optical disks, or tape. Such additional storage is illustrated in FIG. 7 by the non-volatile storage area 768.

Data/information generated or captured by the computing device and stored via the system 702 may be stored locally on the computing device, as described above, or the data may be stored on any number of storage media that may be accessed by the device via the radio interface layer 772 or via a wired connection between the computing device and a separate computing device associated with the computing device, for example, a server computer in a distributed computing network, such as the Internet. As should be appreciated such data/information may be accessed via the computing device via the radio interface layer 772 or via a distributed computing network. Similarly, such data/information may be readily transferred between computing devices for storage and use according to well-known data/information transfer and storage means, including electronic mail and collaborative data/information sharing systems.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using a directory service 824, a web portal 825, a mailbox service 826, an instant messaging store 828, or a social networking site 830.

An application 820 (e.g., similar to the application 620) may be employed by a client that communicates with server device 802. Additionally, or alternatively, embedding object memory insertion engine 821 and/or embedding object memory retrieval engine 822 may be employed by server device 802. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806 and/or a mobile computing device 808 (e.g., a smart phone). Any of these examples of the computing devices may obtain content from the store 816, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, cause the system to perform a set of operations, the set of operations comprising:
   receiving an input;
   creating a task request of a task based on the received input by transforming the received input according to natural language recognition;
   creating a task objective of the task based on the input and task request, wherein the task objective of the task describes an intent underlying the received input by applying transformation to communication data associated with a semantic context of the received input;
   creating one or more prompts comprising the task objective and task request, wherein the one or more prompts include additional context of the input for processing a machine learning model;
   generating, based on a machine learning model processing the one or more prompts as input, a model output; and
   providing the model output to an application of a computing device.

2. The system of claim 1, the set of operations further comprising:
   storing one or more of the input, task request, task objective, prompt, and model output.

3. The system of claim 1, the set of operations further comprising:
   embedding one or more questions for the machine learning model in the one or more prompts;
   receiving from the machine learning model one or more requests for additional context, information, or prompt templates in response to the one or more questions;
   creating one or more updated prompts with the requested context, information, or prompt templates; and
   processing the one or more updated prompts with the machine learning model to generate a model output.

4. The system of claim 1, wherein the creating the one or more prompts further comprising:
   creating one or more embeddings for one or more of the input, task request, and task objective;
   inserting the one or more embeddings in an embedding object memory;
   creating one or more prompt templates that are semantically associated to the one or more embeddings; and
   populating the one or more prompt templates into a prompt.

5. The system of claim 1, the set of operations further comprising:
   evaluating if the model output for responsive to the input.

6. The system of claim 5, the set of operations further comprising:
   receiving the model output;
   generating a score for the model output;
   determining if the score is below a threshold value; and
   when the score is below a threshold value, creating an updated prompt.

7. The system of claim 6, further comprising:
   when the score meets or exceeds the threshold value, providing the model output to an application of the computing device.

8. The system of claim 1, wherein the machine learning model comprises a large language generative transformer model.

9. A computer-implemented method comprising:
   receiving, via a processor, an input;
   creating, via the processor, a task request of a task based on the received input by transforming the received input according to natural language recognition;
   creating, via the processor, a task objective of the task based on the input and task request, wherein the task objective of the task describes an intent underlying the received input by applying transformation on communication data associated with a semantic context of the received input;
   creating, via the processor, one or more prompts comprising the task objective and task request, wherein the one or more prompts include additional context of the input for processing a machine learning model;
   generating, via the processor, based on a machine learning model processing the one or more prompts as input, a model output;
   providing, via the processor, the model output to an application of a computing device.

10. The method of claim 9, further comprising:
storing one or more of the input, task request, task objective, prompt, and model output.

11. The method of claim 9, further comprising:
embedding one or more questions for the machine learning model in the one or more prompts;
receiving from the machine learning model one or more requests for additional context, information, or prompt templates in response to the one or more questions;
creating one or more updated prompts with the requested context, information, or prompt templates; and
processing the one or more updated prompts with the machine learning model to generate a model output.

12. The method of claim 9, wherein generate one or more prompts further comprising:
creating one or more embeddings for one or more of the input, task request, and task objective;
inserting the one or more embeddings in an embedding object memory;
identifying one or more prompt templates that are semantically associated to the one or more embeddings; and
populating the one or more prompt templates into a prompt.

13. The method of claim 9, further comprising:
evaluating if the model output for responsive to the input.

14. The method of claim 13, further comprising:
receiving the model output;
generating a score for the model output;
determining if the score is below a threshold value; and
when the score is below a threshold value, generating an updated prompt.

15. The method of claim 14, further comprising:
when the score meets or exceeds the threshold value, providing the model output to an application of the computing device.

16. The method of claim 14, wherein the machine learning model comprises a large language generative transformer model.

17. A non-transitory computer storage media including instructions, which when executed by a processor, cause the processor to:
receive an input;
create a task request of a task based on the received input by transforming the received input according to natural language recognition;
create a task objective of the task based on the input and task request, wherein the task objective of the task describes an intent underlying the received input by applying transformation to communication data associated with a semantic context of the received input;
create one or more prompts comprising the task objective and task request, wherein the one or more prompts include additional context of the input for processing a machine learning model;
generate, by the machine learning model processing the one or more prompts, a model output; and
provide the model output to an application of a computing device.

18. The non-transitory computer storage media of claim 17, the instructions, which when executed by the processor, further cause the processor to:
embed one or more questions for the machine learning model in the one or more prompts;
receive from the machine learning model one or more requests for additional context, information, or prompt templates in response to the one or more questions;
generate one or more updated prompts with the requested context, information, or prompt templates; and
process the one or more updated prompts with the machine learning model to generate a model output.

19. The non-transitory computer storage media of claim 17, wherein the generate one or more prompts operations further comprising:
generating one or more embeddings for one or more of the input, task request, and task objective;
inserting the one or more embeddings in an embedding object memory;
determining one or more prompt templates that are semantically associated to the one or more embeddings; and
populating the one or more prompt templates into a prompt.

20. The non-transitory computer storage media of claim 17, wherein the machine learning model comprises a large language generative transformer model.

* * * * *